United States Patent [19]

Antula

[11] Patent Number: 4,578,744
[45] Date of Patent: Mar. 25, 1986

[54] A. C. POWER CONVERTER

[76] Inventor: Jovan Antula, 19 Trappentreustrasse, Munich, Fed. Rep. of Germany

[21] Appl. No.: 509,163

[22] Filed: Jun. 29, 1983

[30] Foreign Application Priority Data

Jul. 1, 1982 [DE] Fed. Rep. of Germany ....... 3224636

[51] Int. Cl.⁴ ............................................. H02M 5/45
[52] U.S. Cl. ........................................ 363/37; 363/26; 363/97
[58] Field of Search ...................... 363/34, 37, 24, 25, 363/26, 21, 97, 98, 41, 43

[56] References Cited

U.S. PATENT DOCUMENTS

| 3,517,300 | 6/1970 | McMurray | 363/25 |
| 3,970,916 | 7/1976 | Kienscherf | 363/41 |
| 4,079,307 | 3/1978 | Hazumi et al. | 322/61 |
| 4,353,112 | 10/1982 | Rietveld et al. | 363/97 |

FOREIGN PATENT DOCUMENTS 2915950 10/1979 Fed. Rep. of Germany.

Primary Examiner—Peter S. Wong
Assistant Examiner—Judson H. Jones
Attorney, Agent, or Firm—Frishauf, Holtz, Goodman & Woodward

[57] ABSTRACT

The a. c. power converter forms an electronic alternating voltage transformer for transforming an essentially sinousoidal input alternating voltage of a predetermined frequency, e.g. power line frequency, and a first voltage into a second voltage of the same frequency and essentially the same wave shape. A chopper circuit (52) is coupled between input terminals (50a, 50b) and the primary winding of a transformer (54), dimensioned for the operating frequency of the chopper, e.g. 50-150 kHz. A secondary of the transformer is coupled to a rectifier circuit (60) having two output connections, on each of which one of two unipolar voltages of opposite polarities appear. The output terminals of the rectifier circuit (60) are each coupled through a low-pass filter (73a, 73b) to alternately conductive electronic switches (64a, 64b) and to a first (62a) of two output terminals. The second output terminal (66b) is coupled to a common terminal, e.g. a transformer center tap (56) of the rectifier circuit. A control circuit (70) alternately controls opening and closing of the electronic switches, in synchronism with the input alternating voltage, so that alternating portions of the unipolar voltages which correspond to successive half-waves of the input alternating voltages are pased to the output terminals (66a, 66b) through the alternatingly conductive electronic switches (64a, 64b).

20 Claims, 1 Drawing Figure

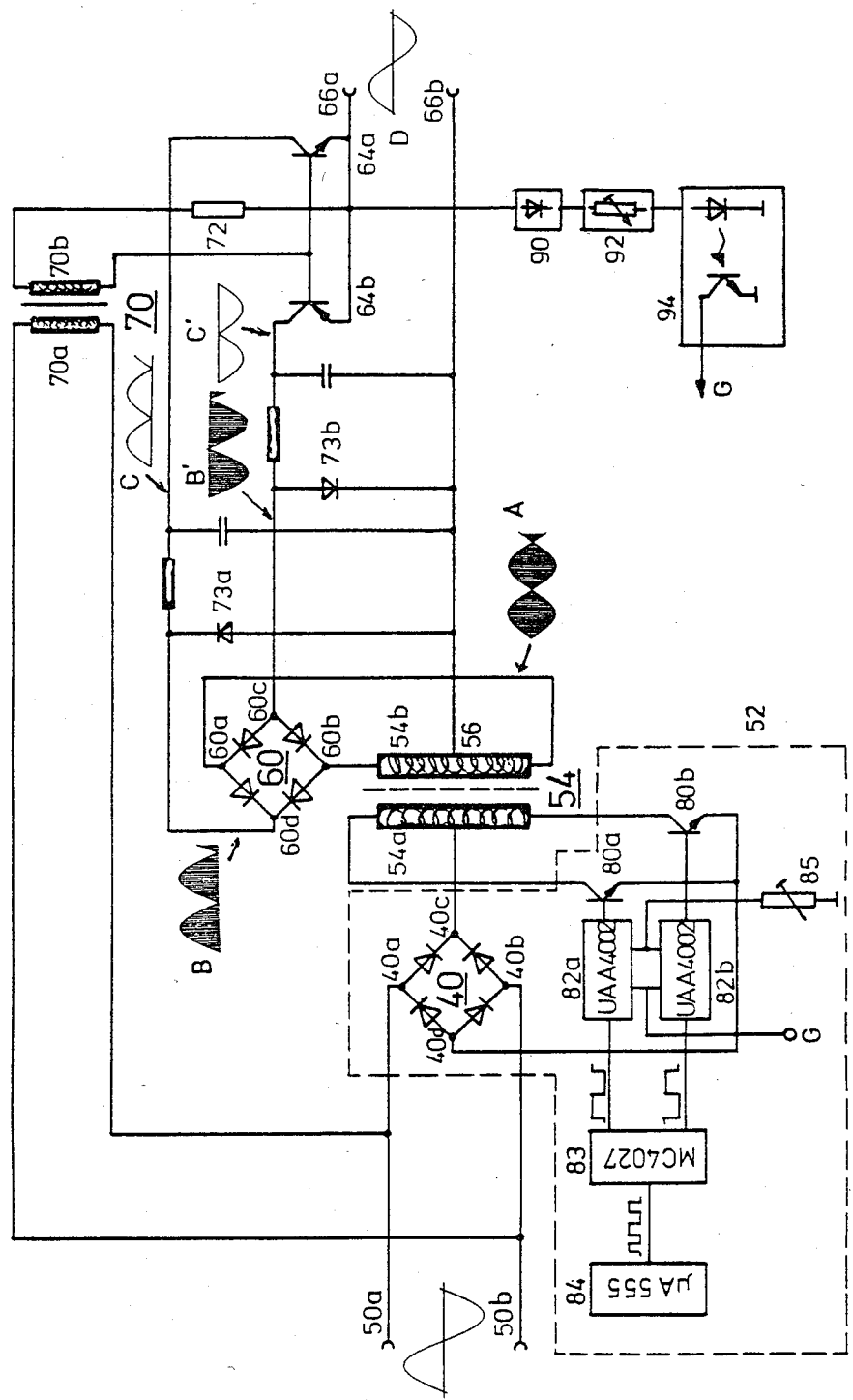

A. C. POWER CONVERTER

The present invention relates to equipment for transforming AC to AC, more specifically an a.c. power converter or electronic transformer useful e.g. for varying the amplitude of sinusoidal alternating energy essentially without changing its frequency and wave shape.

Electronic transformers or converters are known, e.g. from German published patent applications Nos. 20 55 210, 25 25 322 and 29 01 457. The circuits described in these patent applications convert an input alternating voltage or energy of a predetermined frequency, e.g. line frequency, into an output alternating voltage or energy of the same frequency and a second amplitude which may be higher or lower than the amplitude of the input AC voltage, without an intermediate DC voltage produced by rectification of the input voltage and without a relatively bulky and expensive transformer dimensioned for the input voltage frequency. To this end the input alternating voltage is interrupted or "chopped" with an appreciably higher frequency, the chopped input alternating voltage is transformed by means of a transformer, which is dimensioned for the chopper frequency and is therefore relatively small and inexpensive, and the transformed alternating voltage is passed through a low-pass filter to produce the desired essentially sinusoidal output alternating voltage.

U.S. Pat. No. 3,517,300 discloses a power converter circuit in which a low frequency alternating voltage is chopped by a first chopper or inverter operating with a relatively high frequency. The chopped voltage is transformed by a high frequency linear transformer, and the transformed voltage is processed by a second inverter circuit to reconstruct an essentially sinusoidal output voltage.

THE INVENTION

It is an object of the present invention to provide an electronic transformer or a.c. power converter circuit for transforming relatively low frequency, e.g. line frequency of 60 Hz input alternating power into output power of the same frequency, of essentially the same waveform and of a desired amplitude or voltage by means of a relatively simple circuit.

A rectifier circuit is coupled to the secondary winding of a transformer receiving chopped input power. It has two outputs for providing first and second unipolar voltages of opposite polarities obtained by rectification of the voltage appearing at the secondary winding of said transformer. An electronic switch is coupled between each output of said rectifier circuit and a first converter output terminal, a second converter output terminal being coupled to a common output terminal of said rectifier circuit. A control circuit, responsive to the frequency of said input alternating voltage, renders said switches alternately conductive during portions of said unipolar voltages corresponding to successive half-waves of said input voltage.

Preferably, a low-pass filter is coupled in series with each electronic switch.

The circuit portion between the transformer and the output terminals is simple and inexpensive since the switches operate at the frequency of the input voltage and do not need to have fast response and high gain. Most of the circuit is well adapted for being implemented as an integrated circuit.

SHORT DESCRIPTION OF THE DRAWING

The single FIGURE shows a circuit diagram, partly in block form, of a preferred embodiment of the present power converter.

The present a.c. power converter operates with a relatively high chopping frequency, as a frequency that is at least $10^2$ times higher than the frequency of the input alternating voltage. However, an upper limit of the chopping frequency will be generally $10^5$ times the frequency of the input voltage for reasons of circuit economy. Chopping frequencies between 50 and 150 kiloHertz may be used for input voltages of the usual line frequency of 50 or 60 Hertz.

The preferred embodiment of the present a.c. power converter shown in the drawing is designed for input power of line frequency, generally 50 or 60 HZ which is applied to input terminals 50a, 50b. A series circuit comprising a chopper 52, i.e. a periodically closing and opening switching device, and a primary winding 54a of a transformer 54 is coupled across the input terminals 50a, 50b. The transformer 54 is dimensioned for transforming electrical power of the operating frequency of the chopper 52 (chopping frequency), and further comprises a secondary winding 54b having a center tap 56. The secondary winding 54b is coupled to a dual polarity output full wave rectifier circuit 60 (as the rectifier shown, which comprises four semiconductor diodes 60a, 60b, 60c, 60d forming a bridge circuit), and has two output terminals 58a, and 58b. Each output terminal 58a and 58b provides, with reference to the center tap 56 or common terminal, one of two unipolar voltages B, B' of opposite polarities. Output terminal 58a is coupled through a series circuit comprising a low-pass filter 73a, and a first switching device comprising a first transistor 64a having a first conductivity type, to a first output terminal 66a of the converter. Output 58b of the rectifier circuit 60 is coupled through a series circuit comprising a second low-pass filter 73b, and a second switching device comprising a second transistor 64b having a conductivity type opposite to that of said first transistor to the output terminal 66a. A second output terminal 66b of the converter is coupled to said center tap 56 of the transformer 54.

The transistor 64a has a base electrode and an emitter electrode coupled to a base electrode and an emitter electrode, respectively, of the second transistor 64b. A control circuit is coupled between the common base and emitter electrodes of the complementary transistors 64a, 64b. The control circuit comprises a control transformer 70 having a secondary winding 70b coupled in series with a resistor 72 between the base electrodes and the emitter electrodes of the complementary transistors 64a, 63b. The control transformer 70 has a primary winding 70a coupled across the input terminals 50a, 50b.

The chopper may comprise, as shown in the dashed box 52, a full-wave rectifier 40 including four semiconductor diodes connected in a conventional bridge circuit. Input terminals 40a, 40b of the rectifier 40 are connected to a.c. input terminals 50a, 50b. A first d.c. output terminal 50c is coupled to a center tab of primary winding 54a of transformer 54. A second d.c. output terminal 50d is coupled through the emitter-collector paths of respective transistors 80a, 80b to opposite end terminals of primary winding 54a.

The transistors 80a and 80b each comprises a base electrode connected to an individual one-shot multivibrator or driver circuit 82a, 82b, respectively, which may be an integrated circuit of the type UAA 4002 (Thomsen-EFCIS Control Circuit For Fast Switching Transistors). The width or duration of the pulses produced by circuits 82a and 82b for driving the switching or chopping transistors 80a, and 80b, respectively, can be varied by means of variable resistor 85 or a control signal coupled through terminal G to circuits 82a and 82b.

The circuits 82a and 82b respond to square wave signals of opposite phases produced by a flipflop circuit 83 ( e.g. MOTOROLA MC 4027). Flipflop 83 in turn responds to a oscillator or square wave generator circuit 84 (e.g. Fairchild type μA555). Other conventional chopper circuits may used instead of the specific circuit described.

OPERATION

An input alternating voltage is applied across the input terminals 50a, 50b, this voltage generally will also energize the chopper 52 through usual operating voltage supply circuitry not shown. The primary voltage is periodically interrupted by the chopper 52 and the chopped voltage energizes the primary winding 54a of transformer 54. Thus, a relatively high-frequency pulse voltage A which is essentially symmetrical to zero and has an envelope corresponding to the input alternating voltage appears across the secondary winding 54b. The rectifier circuit 60 produces two unipolar pulse voltages B and B' of opposite polarities by rectification of the essentially symmetrical voltage A.

The unipolar pulse voltages B and B' are filtered by the low-pass filters 73a and 73b, respectively, which essentially block the high chopping frequency. Alternatively, the low-pass filters 73a, 73b may be connected between the transistors 64a, and 64b respectively, and the output terminal 66a, or even omitted if no low-pass filtering is necessary.

The transistors 64a, and 64b are rendered alternatingly conductive in synchronism with the symmetrical voltage A, and, thus, with the input voltage, and, thus, pass alternate envelope-half-waves C and C' of the filtered pulse voltages B, and B'. Thus, an alternating voltage comprised of alternating half-waves of opposite polarities, thus, an essentially sinusoidal alternating voltage D, is produced across the output terminals 66a, 66b.

No direct current connection exists between the input circuit and the output circuit of the described converter. Thus, the converter may be used for isolation purposes only, i.e. without a change of the amplitude of the voltage. Any desired maximum amplitude of the output voltage D can be selected by an appropriate ratio of the turns of the primary and secondary windings of the transformer 54. A continuous variation of the amplitude of the output voltage up to the selected maximum voltage may effected by varying the duty cycle of the chopper 52, i.e. the duty cycle or the width of the pulses comprising the chopped input voltage to the transformer 54, which width in turn depends on the resistance of 85 or the value of the signal at pulse width control input terminal G to circuits 82a, 82b.

Output voltage regulation may be effected by coupling output terminal 66a through a negative feedback path including a rectifier circuit 90 and a voltage divider circuit 92 and an optoelectronic coupling circuit 94, to terminal G of circuits 82a, and 83a. The amplitude of the regulated output A.C. voltage appearing across the converter output terminal 66a, 66b may be varied by adjusting the voltage divider circuit 92. A comparator circuit having a reference signal input, e.g. a differential amplifier, may be used instead of or in addition to circuit 92. The optocoupler 94 maintains d.c. isolation between input and output of the converter.

While the invention has been particularly shown and described with references to a preferred embodiment thereof, it will be understood by those skilled in the art that various changes in form and details may be made therein without departing from the scope of the invention.

I claim:

1. An a.c. power converter circuit for converting input alternating power of predetermined waveform, predetermined frequency and predetermined first amplitude into an output alternating power having the said predetermined waveform and frequency and a predetermined second effective voltage, said circuit having
    first and second input terminals for receiving said input alternating power;
    means (52) for periodically interrupting or chopping said input power, said means operating with a chopping frequency which is substantially higher than said predetermined frequency;
    a transformer (54) dimensioned for said chopping frequency and having primary (54a) and secondary (54b) windings, said primary winding (54a) being coupled in series with said interrupting or chopping means (52) across said input terminals and said secondary winding having a center tap (56),
    said converter circuit comprising
    a full wave rectifier circuit (60) coupled to said secondary winding (54b) of said transformer (54), receiving the output (A) therefrom, and having two outputs (56, 58a; 56, 58b) for providing first and second unipolar voltages (B, B') of opposite polarities with respect to the center tap (56), said center tap forming a common terminal of the rectifier circuit;
    two electronic switches (64a, 64b), one each being coupled between a respective rectifier output (58a, 58b) and a first converter output terminal (66a);
    a second converter output terminal (66b) coupled to the common terminal (56) of said rectifier circuit (60); and
    a control circuit (70) coupled to and responsive to said input alternating power in synchronism with and at said predetermined frequency and connected to said electronic switches (64a, 64b), said control circuit controlling said electronic switches to become alternately conductive in synchronism with said predetermined frequency during half cycles of the input power corresponding to respective portions of said unipolar voltages (B, B') which correspond to alternating successive half-waves of said input power to thereby reconstitute said predetermined wave form and frequency.

2. The converter as claimed in claim 1 further comprising a low-pass filter (73a, 73b) coupled between each rectifier output (58a, 58b) and said first converter output terminal (66a).

3. The converter as claimed in claim 1 wherein said second converter output terminal (66b) is connected to the center tap (56) of said secondary winding (54b).

4. The converter as claimed in claim 1 wherein said interrupting or chopping means (52) comprises means (G; 85) for pulse width variation.

5. The converter as claimed in claim 4 wherein said pulse width variation means (G) is responsive to an electric control signal.

6. The converter as claimed in claim 1 wherein said electronic switches (64a, 64b) comprise transistors having opposite conductivity types and each having emitter, collector, and base electrodes, the emitter and collector electrodes of each transistor being coupled between a corresponding rectifier output (58a, 58b) and said first converter output terminal (66a);

and wherein the control circuit includes a control transformer having a primary winding connected to and responsive to the input power at the predetermined frequency, and a secondary winding of a control transformer is connected across the base and emitter electrodes of each transistor.

7. The converter as claimed in claim 6 including a resistor (72) connected in series with the secondary winding of said control transformer.

8. The converter as claimed in claim 1 wherein said operating frequency of said interrupting or chopping means (52) is between $10^2$ and $10^5$ times of the input power frequency.

9. The converter as claimed in claim 1 wherein said input power frequency is power line frequency and the frequency of operation of said interrupting or chopping means (52) is between about 50 and 150 kilo Hertz.

10. The converter as claimed in claim 2 wherein
said second converter output terminal (66b) is connected to the center tap (56) of said secondary winding (54b).

11. The converter as claimed in claim 2 wherein said input power frequency is power line frequency and the frequency of operation of said interrupting or chopping means (52) is between about 50 and 150 kilo Hertz.

12. The converter as claimed in claim 10 wherein said input power frequency is power line frequency and the frequency of operation of said interrupting or chopping means (52) is between about 50 and 150 kilo Hertz.

13. The converter as claimed in claim 1 wherein the control circuit (70) includes a control transformer (70) having a primary winding connected to and responsive to the input power at the predetermined frequency and a secondary winding coupled to and controlling said two electronic switches (64a, 64b) for alternate conduction in synchronism with the predetermined frequency and during occurrence of the respective unipolar voltages derived from said rectifier circuit (60).

14. The converter as claimed in claim 13 further comprising a low-pass filter (73a, 73b) coupled between each rectifier output (58a, 58b) and said first converter output terminal (66a).

15. The converter as claimed in claim 13 wherein,
said second converter output terminal (66b) is connected to the center tap (56) of said secondary winding (54b).

16. The converter as claimed in claim 13 wherein said interrupting or chopping means (52) comprises means (G; 85) for pulse width variation.

17. The converter as claimed in claim 16 further comprising means coupled to one (66a) of the converter output terminals (66a, 66b) generating an electrical control signal, said electrical control signal being coupled to the pulse width variation means (G) of said interrupting or chopping means.

18. The converter as claimed in claim 13 wherein said input power frequency is power line frequency and the frequency of operation of said interrupting or chopping means (52) is between about 50 and 150 kilo Hertz.

19. The converter as claimed in claim 16 wherein said input power frequency is power line frequency and the frequency of operation of said interrupting or chopping means (52) is between about 50 and 150 kilo Hertz.

20. The converter as claimed in claim 13 wherein said interrupting or chopping means (52) comprises means (G) for pulse width variation;
and said pulse width variation means includes
a feedback circuit (90, 92, 94) coupled to one (66a) of said converter output terminals (66b) and to said pulse width variation means (G) of the interrupting or chopping means (52);
and wherein the feedback circuit includes an optical coupler (94) for galvanic isolation between the output terminals (66a, 66b) and the interrupting or chopping means, which interrupt or chop said input power.

* * * * *